US012597155B2

(12) United States Patent (10) Patent No.: US 12,597,155 B2

Allen et al. (45) Date of Patent: Apr. 7, 2026

(54) TRACKING THREE-DIMENSIONAL GEOMETRIC SHAPES

(71) Applicant: MICROSOFT TECHNOLOGY LICENSING, LLC, Redmond, WA (US)

(72) Inventors: Lingzhi L. Allen, Redmond, WA (US); Wolfgang M. Pauli, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 335 days.

(21) Appl. No.: 18/311,476

(22) Filed: May 3, 2023

(65) Prior Publication Data

US 2024/0119615 A1    Apr. 11, 2024

Related U.S. Application Data

(60) Provisional application No. 63/415,257, filed on Oct. 11, 2022.

(51) Int. Cl.
*G06T 7/60* (2017.01)
*G06N 3/084* (2023.01)

(52) U.S. Cl.
CPC ............... *G06T 7/60* (2013.01); *G06N 3/084* (2013.01); *G06T 2207/10016* (2013.01); *G06T 2207/20081* (2013.01); *G06T 2207/20084* (2013.01)

(58) Field of Classification Search
CPC ............. G06T 7/60; G06T 2207/10016; G06T 2207/20081; G06T 2207/20084; G06T 7/70; G06N 3/084
See application file for complete search history.

(56) References Cited

U.S. PATENT DOCUMENTS

| | | | |
|---|---|---|---|
| 2009/0009513 A1 | 1/2009 | van den Hengel | |
| 2020/0104673 A1* | 4/2020 | Michiels | G06N 3/0464 |
| 2022/0122000 A1* | 4/2022 | Li | G06F 18/2113 |
| 2022/0398500 A1* | 12/2022 | Singhal | G06N 20/20 |
| 2023/0326238 A1* | 10/2023 | Valentin | G06V 40/171 |
| | | | 382/118 |

(Continued)

FOREIGN PATENT DOCUMENTS

WO        2012156141 A1    11/2012

OTHER PUBLICATIONS

Birdal, et al., "Generic Primitive Detection in Point Clouds Using Novel Minimal Quadric Fits", In IEEE Transactions on Pattern Analysis and Machine Intelligence, vol. 42, Issue No. 6, Feb. 19, 2019, pp. 1333-1347.

(Continued)

*Primary Examiner* — Bobbak Safaipour
(74) *Attorney, Agent, or Firm* — Han Gim; Newport IP, LLC

(57) ABSTRACT

A set of geometric shapes to be applied by a machine learning model to objects identified in image data is defined. A learning rate of the machine learning model is updated in response to external events. The machine learning model is used to estimate spatial parameters for each of the objects identified in the image data. The spatial parameters are estimated by fitting the objects to the set of geometric shapes. Updates to the spatial parameters are temporally integrated. A spatial estimate of the objects identified in the image data is generated.

20 Claims, 8 Drawing Sheets

(56)        References Cited

U.S. PATENT DOCUMENTS

2024/0249170 A1*  7/2024  Guzik ................... G06N 20/00
2025/0232451 A1*  7/2025  Yu ........................... G06T 7/246
2025/0292431 A1*  9/2025  Tang ........................ G06T 7/85

OTHER PUBLICATIONS

International Preliminary Report on Patentability received for PCT
Application No. PCT/US2023/034329, Apr. 24, 2025, 10 pages.
International Search Report and Written Opinion received for PCT
Application No. PCT/U82023/034329, Feb. 6, 2024, 15 pages.
Kaiser, et al., "A Survey of Simple Geometric Primitives Detection
Methods for Captured 3D Data", Computer Graphics Forum. vol.
No. 38, Issue No.1, Jul. 4, 2018, pp. 167-196.

\* cited by examiner

500

501 — IDENTIFY RELEVANT OBJECTS

503 — ADJUST FOR PERSPECTIVE

505 — PERFORM DISTORTION CORRECTION

507 — FIT A MODEL TO THE OBJECT

TRACKING THREE-DIMENSIONAL GEOMETRIC SHAPES

PRIORITY APPLICATION

This application claims the benefit of and priority to U.S. Provisional Application No. 63/415,257, filed Oct. 11, 2022, the entire contents of which are incorporated herein by reference.

BACKGROUND

Monitoring and controlling the location, size, and orientation of physical objects in complex visual scenes, as well as estimating object-specific characteristics (e.g., tension/sag for cables) is an important task in various industries. Machine learning (ML) is increasingly being utilized to perform a variety of tasks in such environments where ML model estimates may be used in place of explicit programming. Processing data in some ML systems such as in a neural network (NN) or a deep neural network (DNN) typically requires significant numbers of parameters and floating-point operations (FLOPs).

It is with respect to these considerations and others that the disclosure made herein is presented.

SUMMARY

Many fabricated objects are composed of well-defined geometric primitives (e.g., cylinder, cone, plane, cube, sphere). The disclosed embodiments provide a generalizable artificial intelligence (AI) implementation that uses deep learning to recognize objects of interest in a complex visual scene and fits geometric equations corresponding to a known geometric shape of the objects of interest. The disclosed embodiments provide an extension of current three-dimensional (3D) object detection approaches, such as those used in autonomous driving. In autonomous driving, frustums are fit to objects to provide an approximation of object location, size, and orientation. In contrast, the disclosed embodiments fit suitable geometric shapes to objects of interest, thereby allowing the parameters of underlying equations to provide a more suitable and accurate description of the objects of interest. The resulting parameters can be output to downstream users of the data. For example, the users can be mechanical controllers for controlling the objects of interest, or dashboards for decision-making with regard to the objects of interest.

The described embodiments can be implemented without being specific to a particular model architecture. The described embodiments can be applied in various scenarios in which operations would benefit from precise fits of equations for geometric shapes to objects. The described embodiments can be used to either replace or to support existing processes which are currently labor intensive and tedious. Examples of operations that could benefit from precise fits of equations for geometric shapes to objects include:

Estimating the sag and tension of wide-area overhead powerlines to support the expansion and maintenance of power grids. The described embodiments can also be applied to variants such as overhead train powerlines.

Supporting docking maneuvers of water vessels to prevent accidents while docking. Additionally, embodiments can be used to recognize dolphin structures and provide an exact estimate of their location and angle relative to the water vessel.

Similar to water vessel docking, embodiments can be used to support the docking maneuvers of spacecrafts, which are currently manual.

Pipeline (e.g., water, sewer, oil, gas) assessment (e.g., recognizing dents, leaks, cracks).

Monitoring construction materials (e.g., beams, columns, blocks), as they are being lifted by cranes.

The disclosed techniques can be implemented using video data. In an embodiment, video data simultaneously provides high-resolution video frames and point cloud data of a visual scene. Point cloud data is generally a collection of 3D points in space that represent the surface geometry of an object or a scene. The data can be provided by means of a stereo camera or combination of a video camera and laser imaging, detection, and ranging (e.g., Lidar). That is, for each pixel in the visual image, the point cloud data holds an estimate of the corresponding location in 3D space. The disclosed techniques recognize objects of interest in the scene and fit corresponding geometric equations to these objects. The parameters of the fitted equations are sent to the downstream users.

The disclosed embodiments provide an end-to-end optimizable architecture that combines visual images and point cloud data to fit geometric equations to the shapes to objects in visually cluttered scenes, as well as temporal integration of parameters of geometric shapes using standard gradient descent as part of a neural network architecture.

It should be appreciated that, although described in relation to a method, the above-described subject matter may also be implemented as a system, a computer-controlled apparatus, a computer process, a computing system, or as an article of manufacture such as a computer-readable medium and/or dedicated chipset. These and various other features will be apparent from a reading of the following Detailed Description and a review of the associated drawings. This Summary is provided to introduce a selection of concepts in a simplified form that are further described below in the Detailed Description.

This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
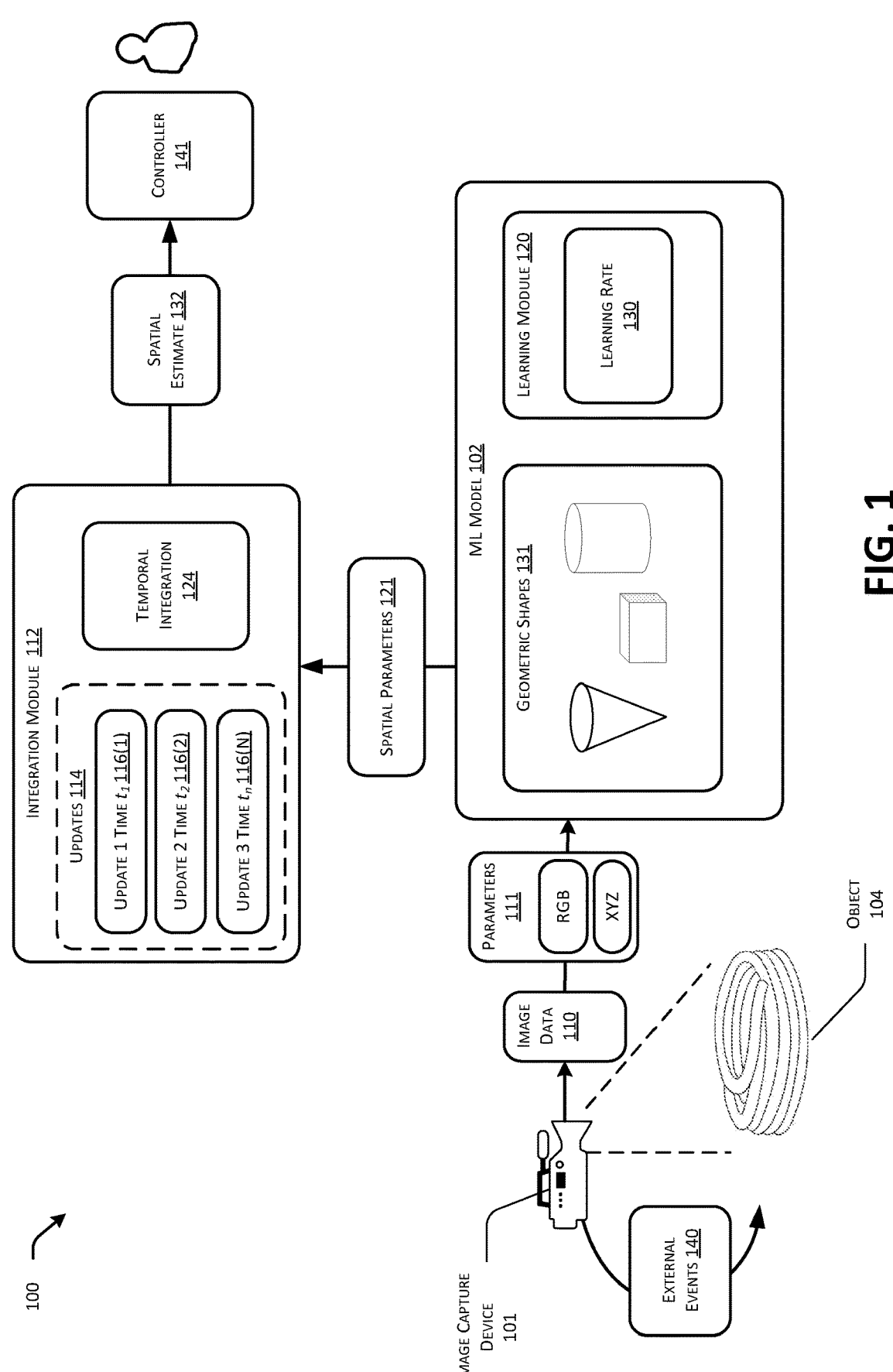
FIG. 1 is a diagram illustrating an embodiment disclosed herein.

Systems that recognize objects in 3D space typically use the frustum as the basic object of geometry. A frustum is a portion of a cone that lies between parallel planes cutting through the cone and is used for estimating three-dimensional regions in image recognition. One example is in autonomous driving applications, which typically fit frustums to objects such as trees, cars, and pedestrians in order to provide an estimate of the location and physical extent of the objects.

However, one common problem is that the use of a single base shape such as the frustum is not the ideal approximation for every type of object, resulting in inaccuracies in the estimations. For example, image recognition is used in cable sag/tension detection during loading and unloading of cables, for example when laying data cables from an ocean vessel or estimating slack in power lines. When laying data cables, a technician typically controls the tension of a cable by manually manipulating the speed of the carousel holding the unlaid cable. This process of laying cables can take many hours and even days, and can suffer from a number of disadvantages—human error can lead to inefficient cable loading (e.g., too much space between cables), accidents can occur due to the movement of heavy cables, and cables can break due to excessive slack or too much tension in the cable. The costs of such issues can include labor repair, downtime, and inventory loss.

The disclosed embodiments allow for fitting not only frustums but other common geometric shapes, such as planes, spheres, and pyramids to objects in image data. By fitting such shapes to objects in image data, the disclosed embodiments enable selection of parameters for geometric shapes that are more suited for image recognition applications, and thus more accurate estimates of object characteristics. Additionally, the various geometric shapes available allow the system to correct for perspective in the image and for distortion in the point cloud data. Accordingly, implementing the disclosed techniques, in many cases, improves the overall accuracy of the image recognition system. Further, by implementing the disclosed techniques for applications in which frustrums are insufficient as a base shape, such as laying data cables, operating costs can be reduced, workplace safety can be improved, and damage to equipment such as cables can be avoided.

Using the described cable example to illustrate, the disclosed embodiments can be used to recognize relevant objects in a scene, including the outer wall of the carousel, the inner wall of the carousel, the floor of the carousel, and the cable. A geometric plane is fit to the floor to correct for perspective, because the location and characteristics of the floor is known. Ellipses are also fit to the walls, to correct for distortion in point cloud coordinate estimates since it is known that the carousel is round with a known radius. A catenary (a curve that describes the shape of a hanging cable) is fit to the cable. The parameters of these equations, including cable curvature, orientation, and touchdown location (location where object of interest has been identified), are sent to a downstream system to manipulate the speed of the cable carousel to automatically optimize cable tension and orientation.

FIG. 1 illustrates an example system 100 in accordance with the disclosed embodiments. The example system 100 enables the fitting of geometric equations that correspond to the known geometric shapes of various objects such as fabricated objects. The example system 100 contrasts with existing approaches that either fit bounding boxes (two-dimensional) or frustums (3D) to objects, which results in less accurate approximations of object size, location, and orientation.

Referring to FIG. 1, image data 110 representing object 104 is provided from an image capture device 101, such as a stereo camera. The input data can be provided from any number and type of image capture devices and can include stereo images or video. Pixels in the image data 110 are classified and their parameters 111 such as color and location are determined. In an embodiment, for each pixel in the image, the pixel's category membership is classified, and its location and space are determined. For example, a selected shape is fit to the pixels and the 3D location so that every pixel is located close to the surface of the geometric shape. For example, in the cable-laying example, a geometric plane is fit to the point cloud coordinates of the carousel floor.

A ML model 102 is fitted with a selection of geometric shapes 131. In an embodiment, a framework for improved performance and accuracy in object recognition applications in accordance with the disclosure includes an open-ended set of geometric shapes. In one embodiment, the ML model 102 is implemented in conjunction with a neural network software library such as Torch or TensorFlow, which enables the image recognition process to be optimizable from end-to-end. Various neural network backbones can be used for the initial process of classifying each pixel. Hardware acceleration provided by graphical processing units (GPUs) can be used to facilitate real-time implementation using video streams.

The geometric shapes 131 are provided via a selection as an input to be applied to the ML model 102. In an embodiment, the image data 110 is adjusted for perspective. In the sea floor cable-laying example, cameras are pointed at the carousel at a given angle. Point cloud coordinates are corrected so that the carousel is leveled. A geometric plane is fit to the point cloud coordinates of the carousel floor. Then, the fitted model is applied to adjust for camera perspective. Distortion correction can also be applied. In the cable-laying example, point cloud coordinates reported by the camera may be distorted. Ellipse(s) are fitted to point cloud data for walls, and coordinates are adjusted based on the ground truth dimensions of the carousel. In some embodiments, ellipses are fit to inner and outer walls, and the point cloud coordinates of the room are adjusted.

In an embodiment, a loss function can be used to identify how many of the pixels or cloud data points are not contained in the geometric object and to determine the error. At each point in time, the ML model has an estimate for the location, orientation, and size of a geometric primitive (e.g., a plane). For each 3D coordinate that is recognized to be part of the plane, the distance of that coordinate from the surface of the plane is calculated because it should be close to or on the surface of the plane). After calculating the distance for each point, the parameters of the equation for the plane are updated so that these distances are reduced on average. In other words, the distances are considered a loss or error which the model minimizes. In an embodiment, the parameters of the geometric equations are maintained from frame to frame, allowing for updated error and weight information to be improved at each frame and allowing for predictions for the geometric shapes.

The spatial parameters 121 of fitted equations for the geometric shapes 131 are sent to an integration module 112 to perform temporal integration 124 of updates 114 to the spatial parameters 121 that can include update 116(1), 116(2) . . . 116(N). In an embodiment, the spatial parameters 121 are updated from frame to frame in an optimizable architecture and the spatial parameters 121 are integrated between frames. For example, the disclosed techniques can be implemented on continuous video data such that estimates are integrated from video frame to video frame. This allows for increasingly precise recognition of objects as well as increasingly precise estimates for their geometric characteristics. Because objects move at finite speed, the estimates for parameters of geometric equations are a combination of the previous estimates of these parameters and current estimates.

In an embodiment, the disclosed techniques can be natively implemented by using standard optimization procedures of a given neural network library, for example using gradient descent. This enables more efficient processing and performance without the overhead of external libraries or dependencies. Gradient descent is an optimization algorithm used in ML to determine values of the parameters that minimize a cost or error function. The fraction by which the gradient is multiplied is referred to as the learning rate, and determines the step size in the parameter space.

In one embodiment, the learning rate 130 is varied in response to inputs and/or events. The learning rate can be adjusted by a learning module 120. In an embodiment, the amount of temporal integration is governed by the learning rate 130. The learning rate 130 governs how much the parameters can change from time step to time step. In the cable-laying example, because the floor should be static, once a set of parameters for the floor is determined, the learning rate 130 is reduced to ensure convergence in the face of noise in the reported coordinates. However, if the camera is moved, the relative or perceived location of the floor may have changed. In this case, the learning rate 130 can be increased for some time, until the model has sufficiently determined new parameters. Increases and decreases in the learning rate 130 can both be implemented without manual intervention. If it is determined that there has been no further reduction in model error for a threshold time period, or when the model error has substantially exceeded expectations for a threshold time period, the learning rate 130 is reduced to allow the estimates to be robust against noise. Determining that the model error has substantially exceeded expectations for a threshold time period can be determined based on the model error remaining at or below a maximum error for a threshold time period. If errors suddenly become consistently large and in the same direction, the learning rate 130 is increased for a short amount of time so that the model can more quickly find better estimates.

The learning rate 130 can be reduced to ensure convergence for relatively static objects and increased in response to external events 140 (e.g., the camera is moved). More generally, in embodiments, the external event is a physical movement of a stationary reference point in the image data. For example, the stationary reference point can be an object that is typically fixed in position and orientation, such as a floor, wall, and even the image capture device itself. In some embodiments, the learning rate 130 is increased if temporal integration between frames is too slow, for example if the camera has been moved. Rather than changing the learning rate 130 to ensure convergence during training on a static dataset, the learning rate 130 can be used to adjust the amount of temporal integration of geometric equation parameters.

Various combinations of the described features, such as learning rate 130 and temporal integration 124, can be combined to implement a suitable framework for a given application.

The resulting spatial estimate 132 can be sent to a downstream controller 141. In some embodiments, the controller 141 provides information for display to a user (e.g., via a dashboard). For example, a user controlling the laying of cabling can use the spatial estimate 132 to detect cable sag/tension during loading and unloading of the cable. The spatial estimate 132 can enable accurate control of the tension of a cable by adjusting the speed of the carousel holding the unlaid cable while avoiding excessive slack or tension in the cable.

Figure 2:
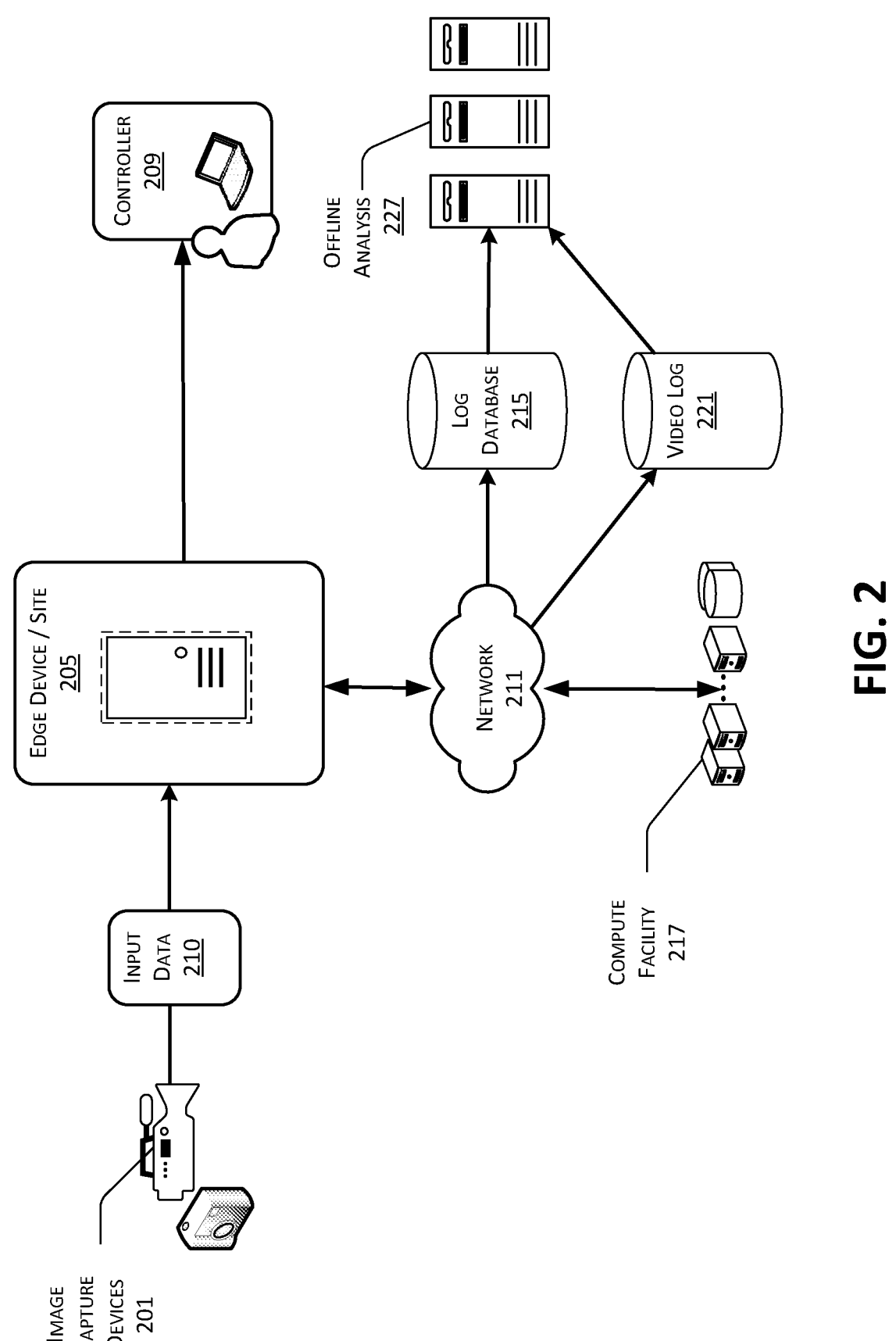
FIG. 2 is a diagram illustrating a model according to an embodiment disclosed herein.

FIG. 2 illustrates one example architecture in accordance with the disclosed embodiments. Input data 210 is provided from a number of image capture devices 201 such as stereo cameras. The image capture devices 201 provide input data to edge device 205. Edge device 205 can be a server or similar computing device that performs at least some of the processes described above and provides outputs to downstream devices such as controller 209 which can be, for example, a carousel controller for a cable-laying operation. Edge device 205 can be situated as an entry or exit point to a user network or a part of a larger network. In an embodiment, edge device 205 offloads some or all processing tasks via network 211 to a compute facility 217 such as a cloud computing provider. Data can also be logged in a log database 215 or video log database 221 for offline analysis 227.

In one embodiment, the disclosed techniques are implemented using off the shelf hardware such as stereo-cameras and GPUs. The disclosed techniques can thus be implemented in multiple scenarios, without requiring major development or modification of existing processes or hardware.

When reference objects (e.g., objects with known characteristics such as location and orientation) are incorporated, the disclosed techniques allow for self-calibration in a given deployment when the camera is moved to a different location and changes the perspective of a scene. For example, in the data cable example, the carousel walls and floor are a known part of the environment, and the location and orientation of objects can be calibrated in relation to the carousel walls and floor.

The disclosed techniques can be efficiently adapted to new scenarios and new objects. In an embodiment, a user without expertise in ML or artificial intelligence (AI) can annotate images of a scene using polygons to outline any objects of interest. The user can also create a dictionary that associates each object with a corresponding shape (e.g., floor: plain; carousel wall: cylinder). In an embodiment, a group of shapes may be provided in the dictionary, and the dictionary can be updated with additional shapes depending on the application and target environment.

The disclosed techniques improve upon existing solutions for object tracking by performing 3D space temporal integration of parameter estimates across scenes. In an embodiment, geometric equations to all relevant objects are fit using only the first frame. Consecutive frames are then fit and parameters of geometric equations are updated directly using gradient descent. This achieves increasingly precise estimates for these parameters, and allows for more accurate tracking of objects in space. Existing solutions typically separate object detection and tracking into separate stages. For example, one model may perform object detection in video frames, treating each video frame as an independent measure. A second model is then used to track objects in space across time. Existing approaches that perform more advanced temporal integration of object information typically aim to improve object recognition accuracy (presence/absence of objects), while the disclosed techniques improve the precision of tracking and estimating the location of objects by improving the estimates of geometric equations for objects known to be present in the scene. Techniques that focus on precise estimates of geometric equations often require ground truth data for the parameters of the equations for training. In contrast, the present disclosure only requires ground truth data for training the object recognition model, while the fitting of the geometric shapes is learned in an unsupervised fashion.

Returning to the example of the estimation of sag in power cables, ML-based solutions have been attempted previously. Existing solutions require many sequential processing steps, with various algorithms applied at each step, which prevents end-to-end optimization. Because of the multiple steps used in the existing approaches, errors in earlier stages are propagated through later stages of processing pipelines. Furthermore, existing approaches do not combine video and point cloud data, but rely entirely on point cloud data. These approaches therefore require more costly hardware for point cloud measurement (e.g., Lidar) and yet do not adequately address the challenge of operating in cluttered visual scenes.

In the example of pipeline assessment, AI solutions can be applied, but they typically require extensive supervised training for robustness against variation in lighting as well as the color and shape of pipelines. Current solutions are trained on specific pipelines and defects (e.g., dents and cracks) using only visual information and without including point cloud data. Existing solutions require costly annotation of numerous examples for each type of defect that occur on pipelines. In contrast, the disclosed techniques only require training a model to recognize a pipeline. In an embodiment, a cylinder is fit to the pipeline, and defects are recognized by identifying clusters of point cloud coordinates that significantly deviate from the predicted location, given the known geometric shape of the object.

Figure 3:
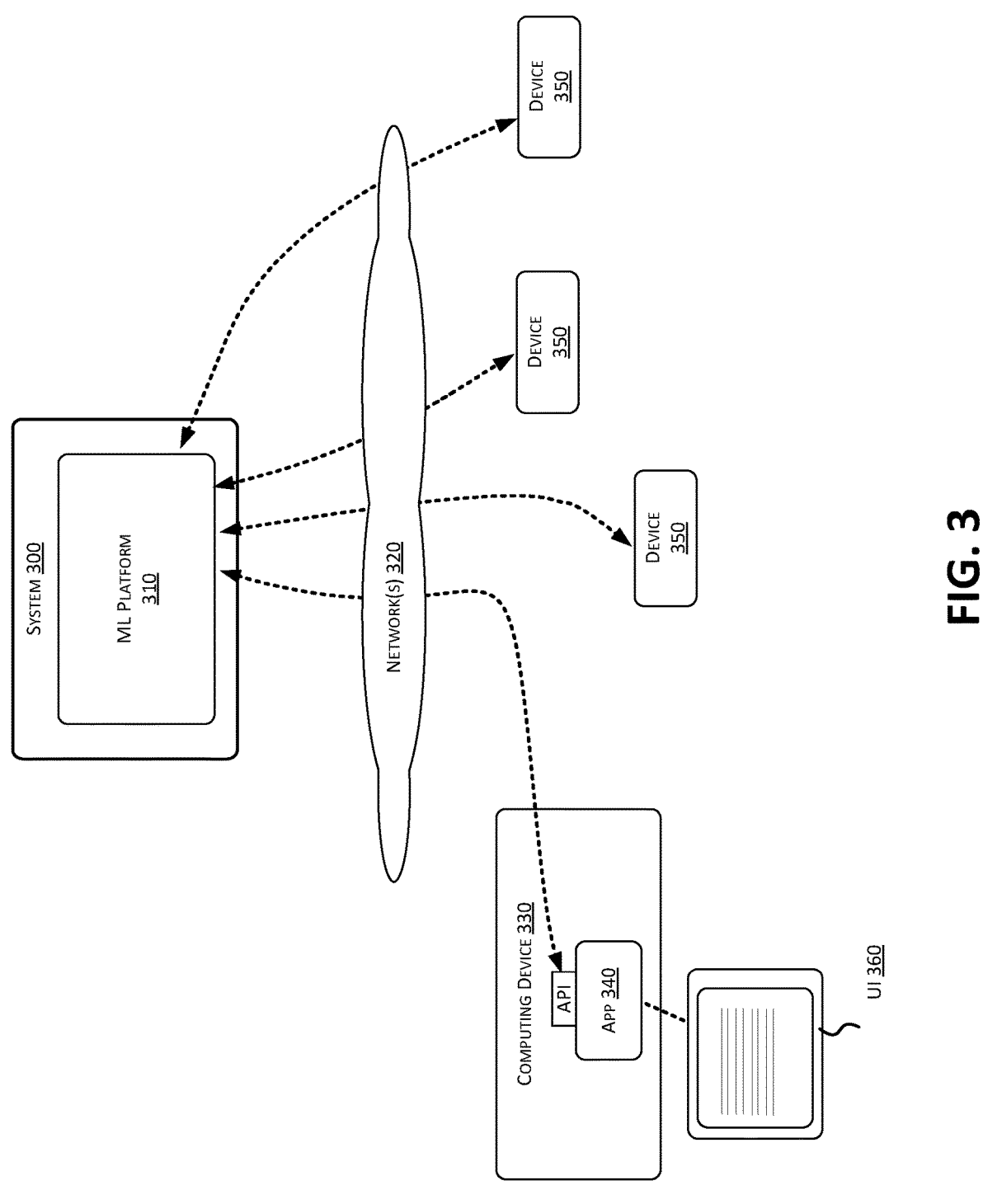
FIG. 3 is a diagram showing aspects of an example system according to an embodiment disclosed herein.

In the example system illustrated in FIG. 3, a system 300 is illustrated that implements a ML platform 310. The ML platform 310 is configured to provide output data to various devices 350 over a network 320, as well as computing device 330. A user interface 360 is rendered on computing device 330. The user interface 360 is provided in conjunction with an application 340 that communicates to the ML platform 310 using an API via network 320. In some embodiments, system 300 is configured to provide information to users. In one example, system 300 runs a ML platform 310 to perform one or more tasks. The ML platform 310 utilizes the ML system to perform tasks such as image recognition. The ML platform 310 is configured to be optimized using the techniques described herein.

Figure 4:
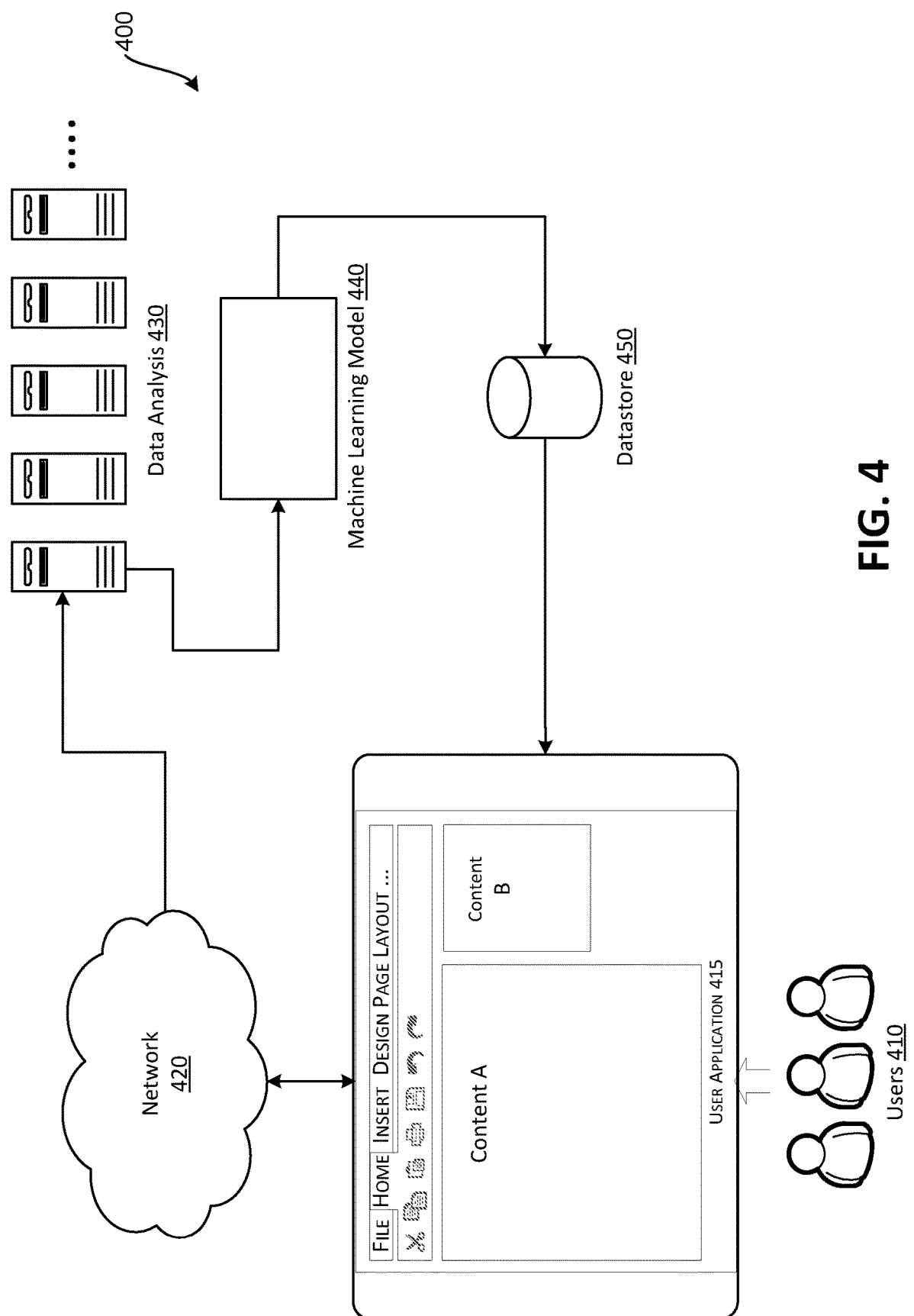
FIG. 4 is a diagram showing aspects of an example system according to an embodiment disclosed herein.

FIG. 4 is a computing system architecture diagram showing an overview of another system disclosed herein for implementing a machine learning model, according to one embodiment disclosed herein. As shown in FIG. 4, a ML system 400 is illustrated that shows further detail to system 300 shown in FIG. 3. ML system 400 is configured to perform analysis and perform identification, prediction, or other functions based upon various data collected by and processed by data analysis components 430 (which can be referred to individually as an "data analysis component 430" or collectively as the "data analysis components 430"). The data analysis components 430, for example, includes physical computing devices such as server computers or other types of hosts, associated hardware components (e.g., memory and mass storage devices), and networking components (e.g., routers, switches, and cables) communicating over a network 420. The data analysis components 430 can also include software, such as operating systems, applications, containers, network services, and virtual components, such as virtual disks, virtual networks, and virtual machines. The datastore 450 can include data, such as a database, or a database shard (i.e., a partition of a database). Feedback is used to further update various parameters that are used by machine learning model 440. Data is provided to the user application 415, which can be used to provide results to various users 410. In some configurations, machine learning model 440 is configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
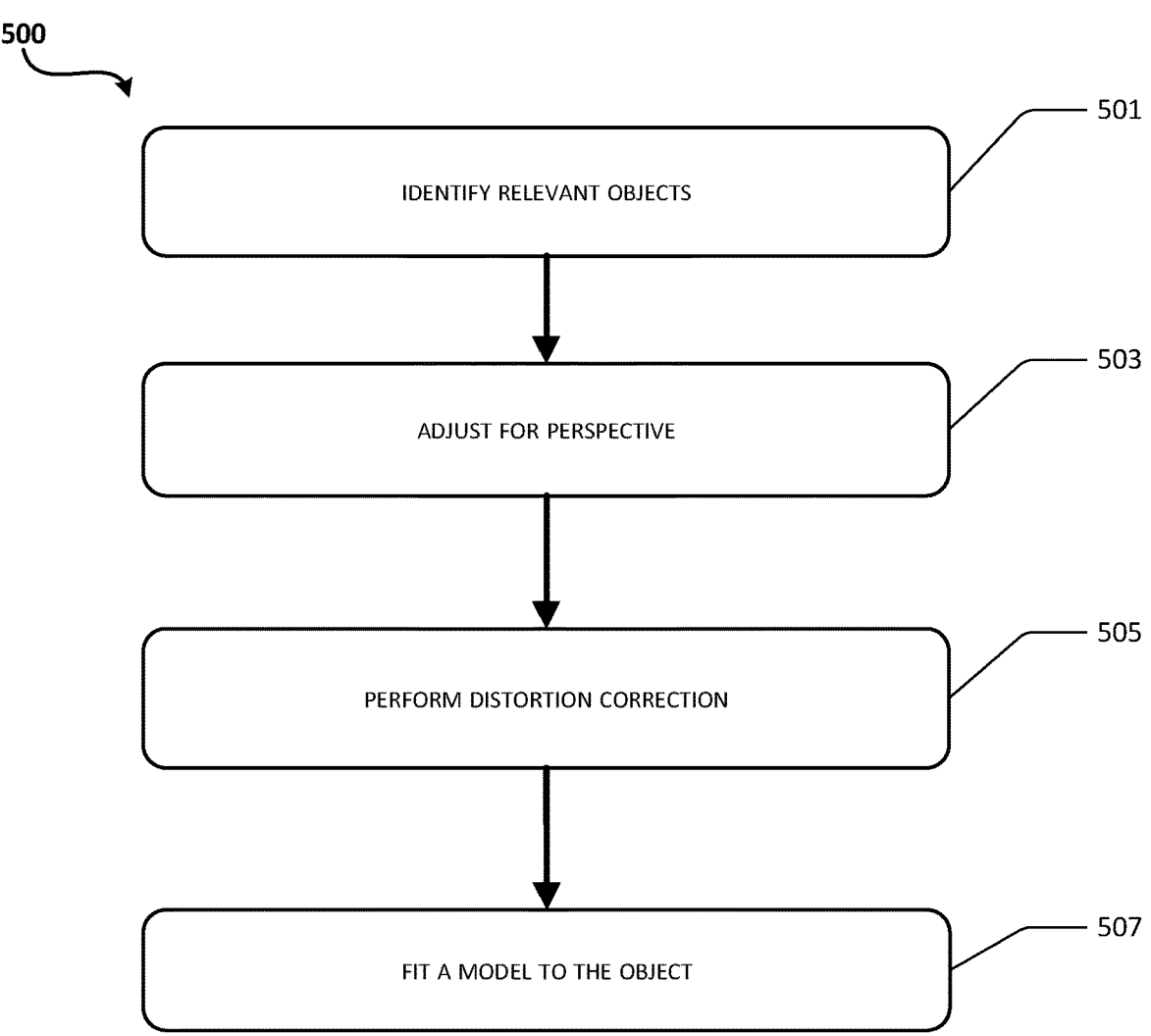
FIG. 5 is a flow diagram showing aspects of an illustrative routine, according to an embodiment disclosed herein.

Turning now to FIG. 5, illustrated is an example operational procedure 500 in accordance with the present disclosure. The operational procedure can be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates identifying relevant objects. The input data can include media such as video media. The input data can be provided directly from input devices such as a number of image capture devices and can include stereo images or video. The input data can be provided indirectly such as processed data that was originally captured on other input devices. In an embodiment, for each pixel in the image, the pixel's category membership is classified, and its location and space are determined. For example, a selected shape is fit to the pixels and the 3D location so that every pixel is located close to the surface of the geometric shape. For example, in the sea floor cable-laying example, a geometric plane is fit to the point cloud coordinates of the carousel floor, or in the example of pipeline assessment, the geometric plane is fit to the point cloud coordinates of the ocean floor.

Operation 503 illustrates adjusting for perspective. In the sea floor cable-laying example, cameras are pointed at the carousel at a given angle. Point cloud coordinates are corrected so that the carousel is leveled. A geometric plane is fit to the point cloud coordinates of the carousel floor. Then, the fitted model is applied to adjust for camera perspective.

Operation 505 illustrates performing distortion correction. In the sea floor cable-laying example, point cloud coordinates reported by the camera are distorted. An ellipse is fitted to point cloud data for walls, and coordinates are adjusted based on the ground truth dimensions of the carousel. Ellipses are fit to inner and outer walls. Point cloud coordinates of the room are adjusted.

Operation 507 illustrates fitting a model to the object (e.g., fit a catenary model to the cable). The model returns the curvature and exact touchdown location of the cable. The speed of the carousel can be adjusted automatically, to match ideal cable curvature and location. In an embodiment, the optimization process comprises a stochastic method including a gradient method.

Figure 6:
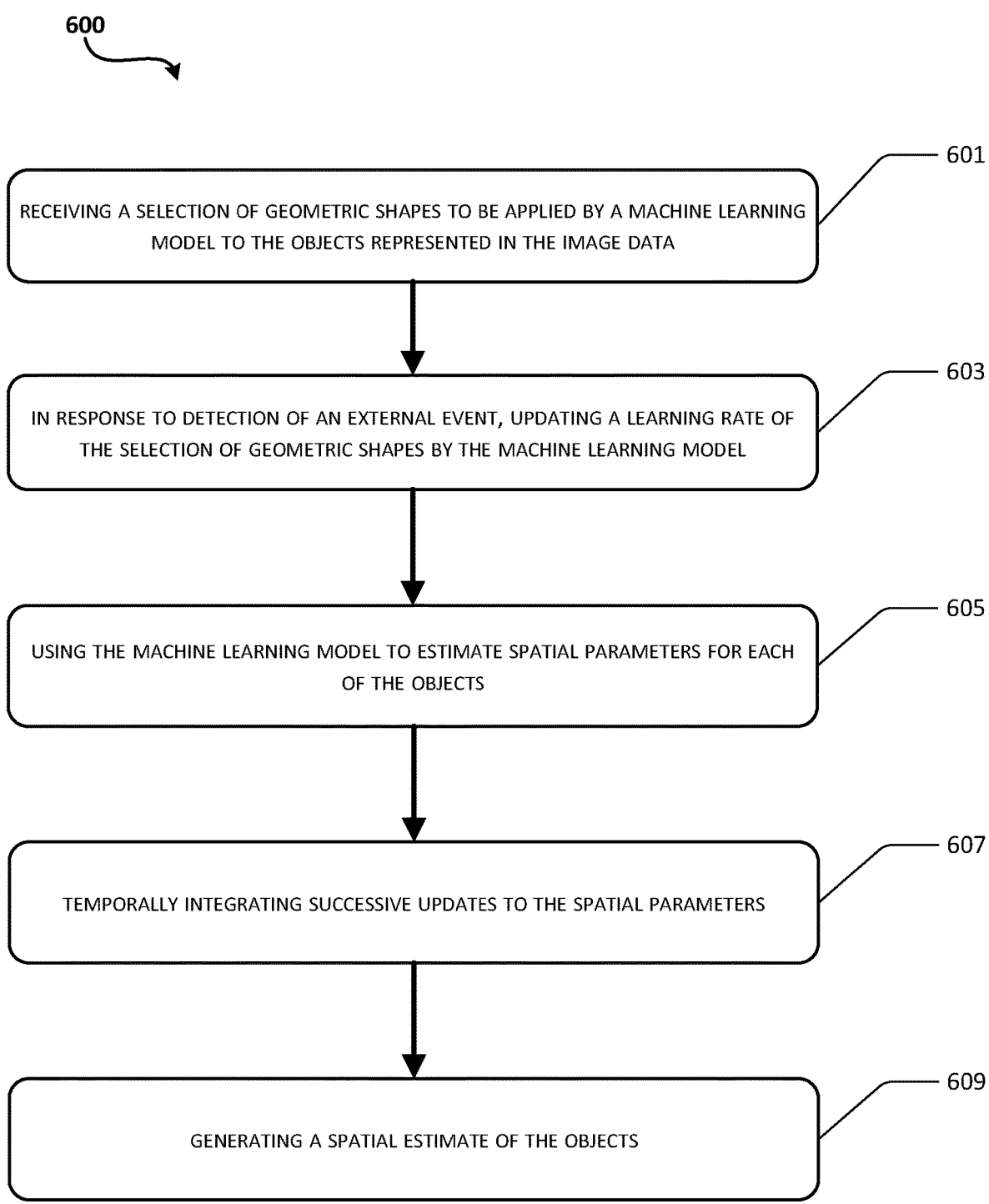
FIG. 6 is a flow diagram showing aspects of an illustrative routine, according to an embodiment disclosed herein.

Referring to FIG. 6, procedure 600 includes operation 601 which illustrates rece receiving a selection of geometric shapes to be applied by a machine learning model to the objects represented in the image data. Operation 603 illustrates in response to detection of an external event, updating a learning rate of the selection of geometric shapes by the machine learning model. In an embodiment, the geometric shapes include one or more of a cylinder, cone, plane, cube, or sphere. In an embodiment, the external event comprises a physical movement of a stationary reference point in the image data. Operation 605 illustrates using the machine learning model to estimate spatial parameters for each of the objects. In an embodiment, the spatial parameters are estimated by fitting the geometric shapes to the objects. In an embodiment, the image data comprises video frame data and the successive updates to the spatial parameters are temporally integrated across a plurality of video frames of the video frame data using gradient descent.

Figure 7:
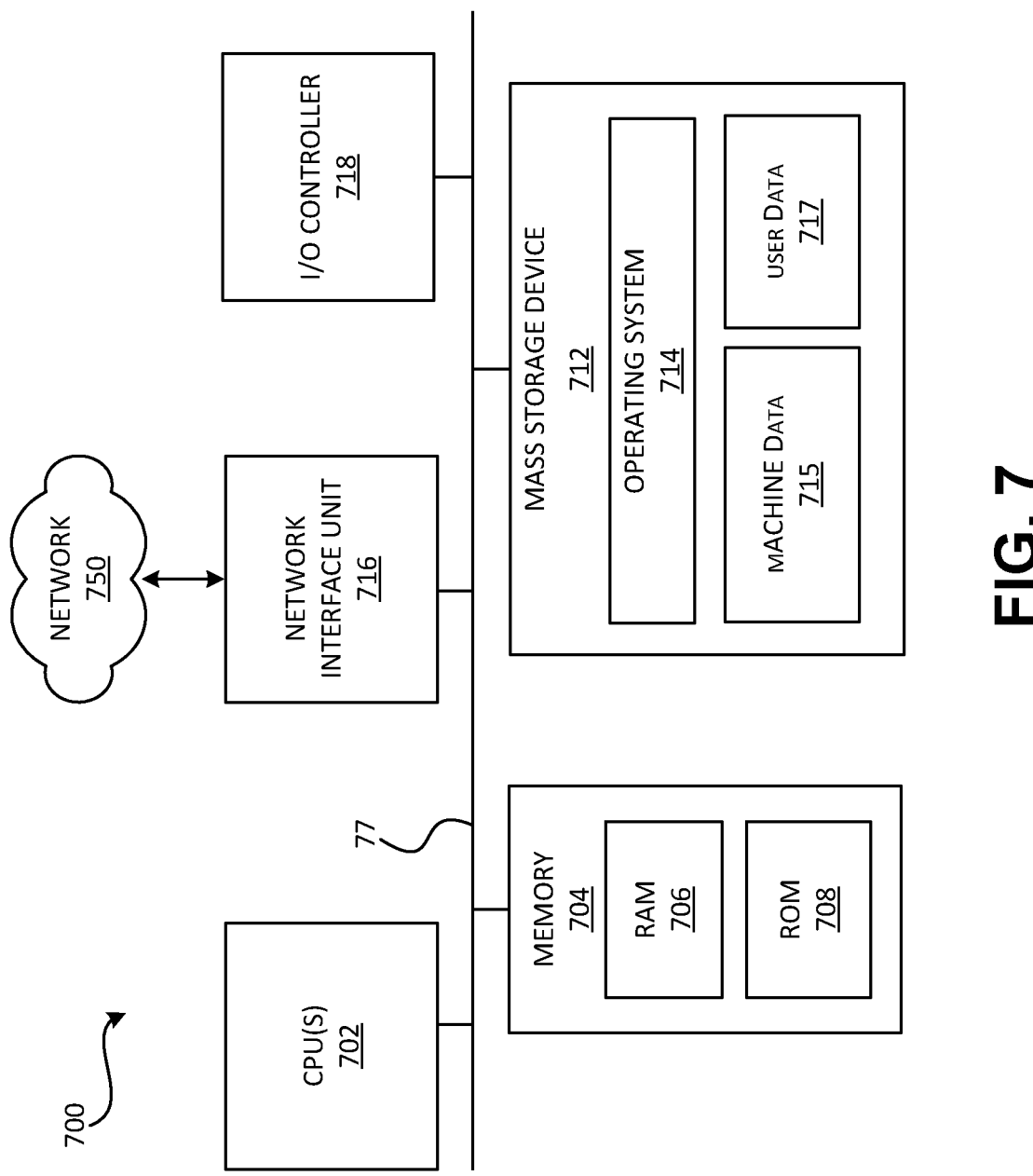
FIG. 7 is a computer architecture diagram illustrating aspects of an example computer architecture for a computer capable of executing the software components described herein.

Operation 607 illustrates generating integrated spatial parameters by temporally integrating successive updates to the spatial parameters. In an embodiment, the successive updates to the spatial parameters are temporally integrated using gradient descent. Operation 609 illustrates generating a spatial estimate of the objects based on the integrated spatial parameters. In an embodiment, the spatial estimate of the objects identified in the image data is output to a controller to manipulate the objects. In some embodiments, the learning rate is updated in response to a determination that there has been no reduction in model error for a first threshold time period, or that the model error has remained at or below a maximum error for a second threshold time period FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a bus 77 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, such as product data 715 or user data 717.

The mass storage device 712 is connected to the CPU 702 through a mass storage controller (not shown) connected to the bus 77. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, communication media includes wired media such as a wired network or direct-wired connection, and wireless media such as acoustic, radio frequency, infrared and other wireless media. Combinations of the any of the above should also be included within the scope of computer-readable media.

By way of example computer-readable storage media might include volatile and non-volatile, removable and non-removable media implemented in any method or technology for storage of information such as computer-readable instructions, data structures, program modules or other data. For example, computer media includes RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 77. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7).

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
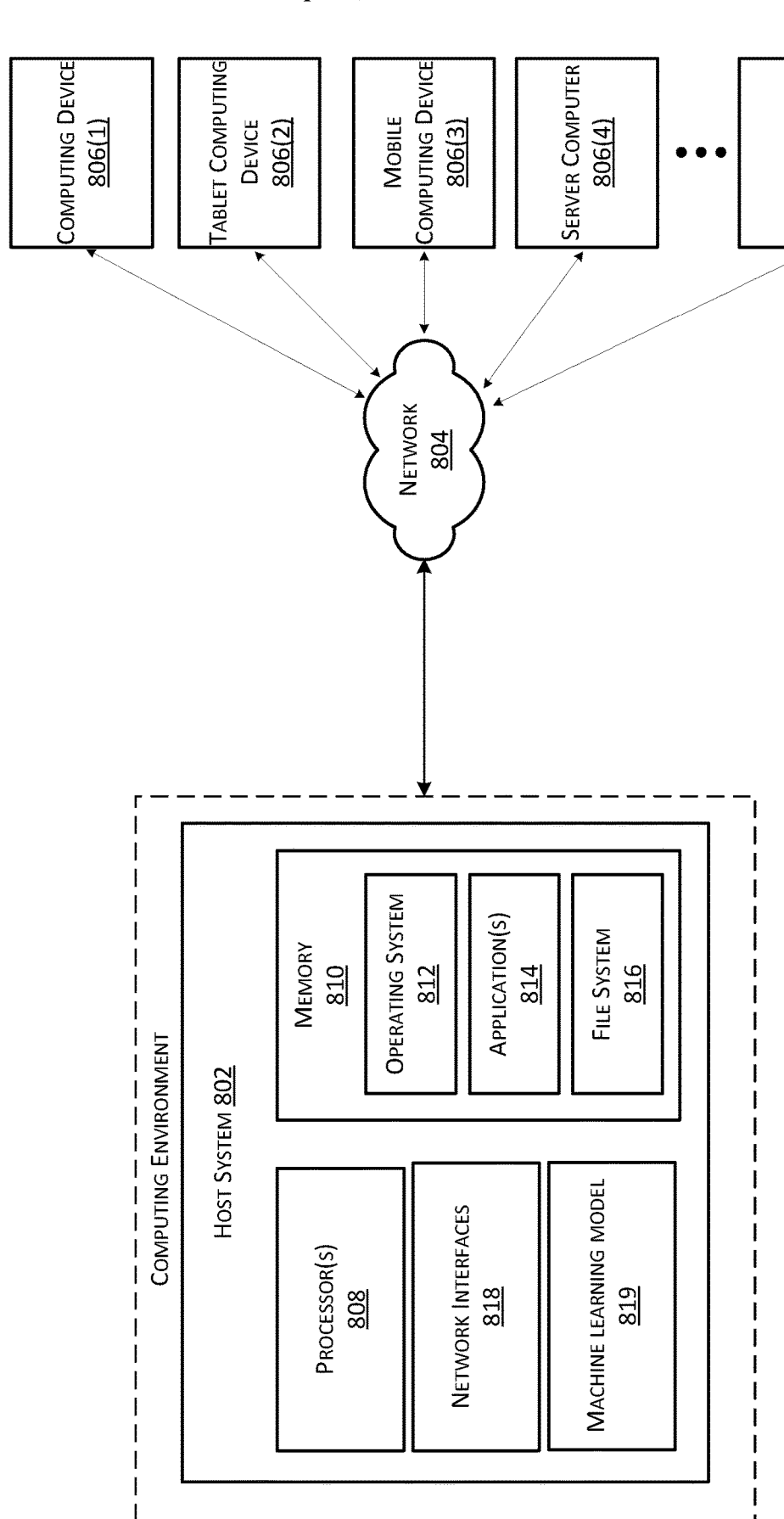
FIG. 8 is a data architecture diagram showing an illustrative example of a computer environment.

FIG. 8 illustrates an example computing environment capable of executing the techniques and processes described above with respect to FIGS. 1-7. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include a processing system comprising processor(s) 808 memory 810. The memory 810 can comprise an operating system 812, application(s) 814, and/or a file system 816.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices. The host system 802 may also include machine learning model 819.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause A: A method of analyzing image data using a machine learning model, the method comprising: defining a set of geometric shapes to be applied to a machine learning model implemented in a computing system; estimating parameters for each object in an input image, wherein parameter estimates are temporally integrated; updating a learning rate of the machine learning model in response to external events; and executing the machine learning model to generate an output based on the parameters.

Clause B: The method of clause A, wherein the parameter estimates are temporally integrated using gradient descent.

Clause C: The method of any of clauses A-B, wherein the parameter estimates are temporally integrated across a plurality of scenes or frames.

Clause D: The method of any of clauses A-C, wherein the geometric shapes include one or more of a cylinder, cone, plane, cube, or sphere.

Clause 1: A method of analyzing image data to estimate spatial parameters of objects represented in the image data, the method comprising: receiving a selection of geometric shapes to be applied by a machine learning model to the objects represented in the image data; in response to detection of an external event, updating a learning rate of the selection of geometric shapes by the machine learning model; using the machine learning model to estimate spatial parameters for each of the objects, wherein the spatial parameters are estimated by fitting the geometric shapes to the objects; generating integrated spatial parameters by temporally integrating successive updates to the spatial parameters; and generating a spatial estimate of the objects based on the integrated spatial parameters.

Clause 2: The method of clause 1, wherein the successive updates to the spatial parameters are temporally integrated using gradient descent.

Clause 3: The method of any of clauses 1-2, wherein the image data comprises video frame data and the successive updates to the spatial parameters are temporally integrated across a plurality of video frames of the video frame data using gradient descent.

Clause 4: The method of any of clauses 1-3, wherein the geometric shapes include one or more of a cylinder, cone, plane, cube, or sphere.

Clause 5: The method of any of clauses 1-4, further comprising outputting the spatial estimate of the objects identified in the image data to a controller to manipulate the objects.

Clause 6: The method of any of clauses 1-5, wherein the external event comprises a physical movement of a stationary reference point in the image data.

Clause 7: The method of clauses 1-6, further comprising updating the learning rate in response to a determination that there has been no reduction in model error for a first threshold time period, or that the model error has remained at or below a maximum error for a second threshold time period.

Clause 8: A computing system comprising: a processing system comprising a processor; and computer-readable media having thereon computer-executable instructions that are structured such that, when executed by the processing system, cause the computing system to perform operations comprising: accessing a set of geometric shapes to be applied by a machine learning model to objects identified in image data; updating a learning rate of the machine learning model in response to an external event; estimating spatial parameters for each of the objects using the machine learning model, wherein the spatial parameters are estimated by fitting the set of geometric shapes to the objects; temporally integrating successive updates to the spatial parameters; and generating a spatial estimate of the objects identified in the image data.

Clause 9: The computing system of 8, wherein the successive updates to the spatial parameters are temporally integrated using gradient descent.

Clause 10: The computing system of any of clauses 8 and 9, wherein the image data comprises video frame data and the successive updates to the spatial parameters are temporally integrated across a plurality of video frames of the video frame data.

Clause 11: The computing system of any clauses 8-10, wherein the set of geometric shapes include one or more of a cylinder, cone, plane, cube, or sphere.

Clause 12: The computing system of any clauses 8-11, further comprising outputting the spatial estimate of the objects to a controller to manipulate the objects.

Clause 13: The computing system of any clauses 8-12, wherein the external event comprises a physical movement of a stationary reference point in the image data.

Clause 14: The computing system of any clauses 8-13, further comprising updating the learning rate of the machine learning model in response to a determination that there has been no reduction in model error for a threshold time period.

Clause 15: A computer-readable storage medium having thereon computer-executable instructions that are structured such that, when executed by a processing system of a computing system, cause the computing system to perform operations comprising: defining a set of geometric shapes to be applied by a machine learning model to objects identified in image data; updating a learning rate of the machine learning model in response to an external event; estimating spatial parameters for each of the objects using the machine learning model, wherein the spatial parameters are estimated by fitting the set of geometric shapes to the objects; temporally integrating successive updates to the spatial parameters; and generating a spatial estimate of the objects identified in the image data.

Clause 16: The computer-readable storage medium of clause 15, wherein the successive updates to the spatial parameters are temporally integrated using gradient descent.

Clause 17: The computer-readable storage medium of any of clauses 15 and 16, wherein the image data comprises video frame data and the successive updates to the spatial parameters are temporally integrated across a plurality of video frames of the video frame data.

Clause 18: The computer-readable storage medium of any of the clauses 15-17, wherein the set of geometric shapes include one or more of a cylinder, cone, plane, cube, or sphere.

Clause 19: The computer-readable storage medium of any of the clauses 15-18, further comprising outputting the spatial estimate of the objects identified in the image data to a controller to manipulate the objects.

Clause 20: The computer-readable storage medium of any of the clauses 15-19, wherein the external events comprise a physical movement of a stationary reference point in the image data.

What is claimed is:

1. A method of analyzing image data to estimate spatial parameters of objects represented in the image data, the method comprising:

receiving a selection of geometric shapes to be applied by a machine learning model to the objects represented in the image data;

in response to detection of an external event, updating a learning rate of the selection of geometric shapes by the machine learning model;

using the machine learning model to estimate spatial parameters for each of the objects, wherein the spatial parameters are estimated by fitting the geometric shapes to the objects;

generating integrated spatial parameters by temporally integrating successive updates to the spatial parameters; and generating a spatial estimate of the objects based on the integrated spatial parameters.

2. The method of claim 1, wherein the successive updates to the spatial parameters are temporally integrated using gradient descent.

3. The method of claim 1, wherein the image data comprises video frame data and the successive updates to the spatial parameters are temporally integrated across a plurality of video frames of the video frame data using gradient descent.

4. The method of claim 1, wherein the geometric shapes include one or more of a cylinder, cone, plane, cube, or sphere.

5. The method of claim 1, further comprising outputting the spatial estimate of the objects identified in the image data to a controller to manipulate the objects.

6. The method of claim 1, wherein the external event comprises a physical movement of a stationary reference point in the image data.

7. The method of claim 1, further comprising updating the learning rate in response to a determination that there has been no reduction in model error for a first threshold time period, or that the model error has remained at or below a maximum error for a second threshold time period.

8. A computing system comprising:

a processing system comprising a processor; and computer-readable media having thereon computer-executable instructions that are structured such that, when executed by the processing system, cause the computing system to perform operations comprising:

accessing a set of geometric shapes to be applied by a machine learning model to objects identified in image data;

updating a learning rate of the machine learning model in response to an external event;

estimating spatial parameters for each of the objects using the machine learning model, wherein the spatial parameters are estimated by fitting the set of geometric shapes to the objects;

temporally integrating successive updates to the spatial parameters; and generating a spatial estimate of the objects identified in the image data.

9. The computing system of claim 8, wherein the successive updates to the spatial parameters are temporally integrated using gradient descent.

10. The computing system of claim 8, wherein the image data comprises video frame data and the successive updates to the spatial parameters are temporally integrated across a plurality of video frames of the video frame data.

11. The computing system of claim 8, wherein the set of geometric shapes include one or more of a cylinder, cone, plane, cube, or sphere.

12. The computing system of claim 8, further comprising outputting the spatial estimate of the objects to a controller to manipulate the objects.

13. The computing system of claim 8, wherein the external event comprises a physical movement of a stationary reference point in the image data.

14. The computing system of claim 8, further comprising updating the learning rate of the machine learning model in response to a determination that there has been no reduction in model error for a threshold time period.

15. A computer-readable storage medium having thereon computer-executable instructions that are structured such that, when executed by a processing system of a computing system, cause the computing system to perform operations comprising:

defining a set of geometric shapes to be applied by a machine learning model to objects identified in image data;

updating a learning rate of the machine learning model in response to an external event;

estimating spatial parameters for each of the objects using the machine learning model, wherein the spatial parameters are estimated by fitting the set of geometric shapes to the objects;

temporally integrating successive updates to the spatial parameters; and generating a spatial estimate of the objects identified in the image data.

16. The computer-readable storage medium of claim 15, wherein the successive updates to the spatial parameters are temporally integrated using gradient descent.

17. The computer-readable storage medium of claim 15, wherein the image data comprises video frame data and the successive updates to the spatial parameters are temporally integrated across a plurality of video frames of the video frame data.

18. The computer-readable storage medium of claim 15, wherein the set of geometric shapes include one or more of a cylinder, cone, plane, cube, or sphere.

19. The computer-readable storage medium of claim 15, further comprising outputting the spatial estimate of the objects identified in the image data to a controller to manipulate the objects.

20. The computer-readable storage medium of claim 15, wherein the external events comprise a physical movement of a stationary reference point in the image data.

* * * * *